United States Patent Office 3,320,798
Patented May 23, 1967

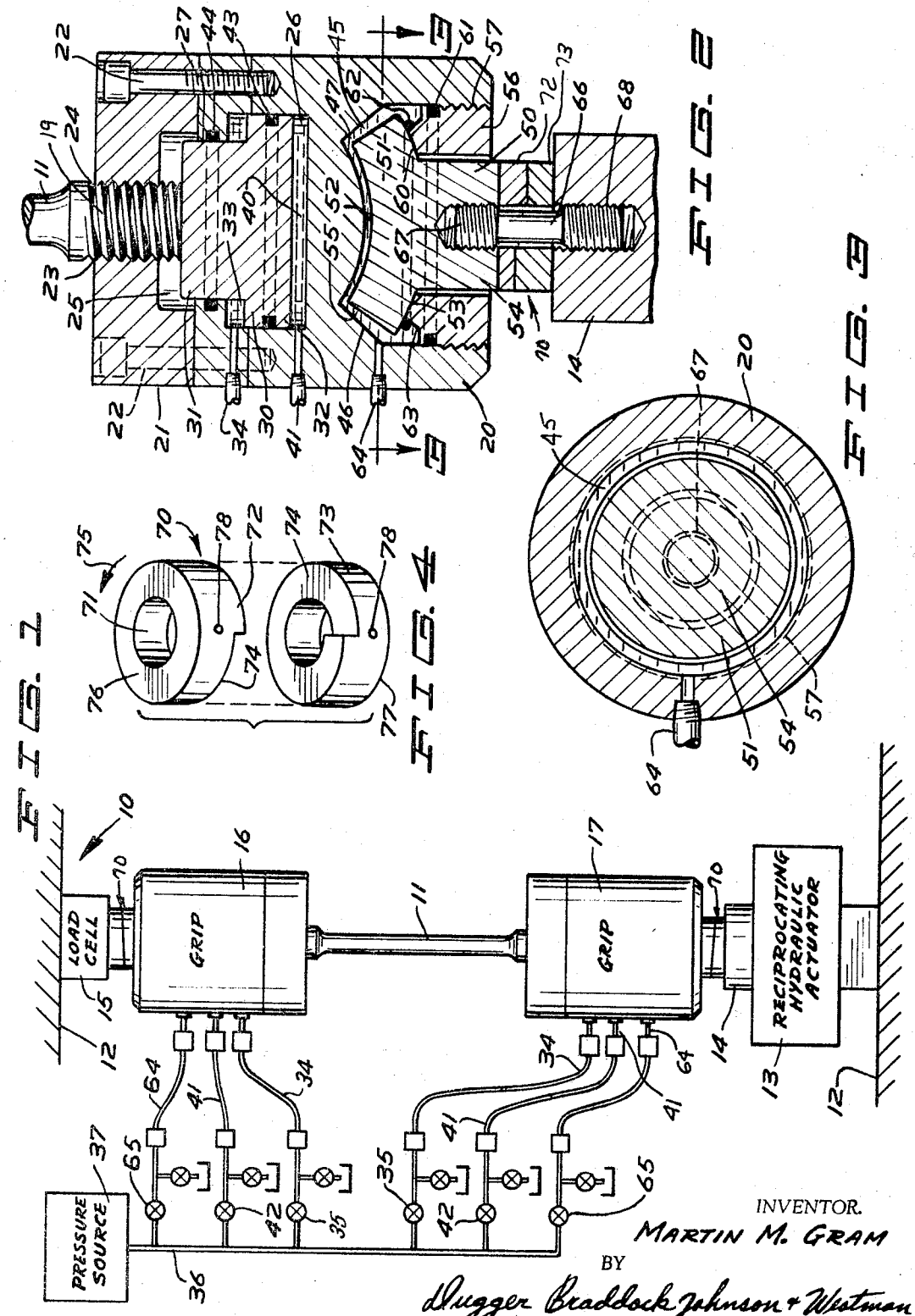

3,320,798
HYDRAULIC ALIGNMENT HEAD FOR SPECIMEN TESTING
Martin M. Gram, St. Paul, Minn., assignor to MTS Systems Corporation, a corporation of Minnesota
Filed Oct. 12, 1964, Ser. No. 403,213
13 Claims. (Cl. 73—103)

The present invention has relation to a grip or head for holding specimens in a testing machine and more particularly to a hydraulically operated alignment device which will provide perfect alignment of the gripping members for the specimen.

The present time, in the testing of specimens, particularly in fatigue tests, where the load on the specimen is cycled through compression and tension loads, it has been found ot be nearly impossible to obtain perfect alignment of the specimen axis and the load axis of the two grips holding the specimen. The attachment devices, such as threads, wedge grips or button heads, all are subject to imperfections which cause misalignment. Without perfect alignment, bending stresses are introduced into the specimen thus giving erroneous results to the testing program.

The device of the present invention presents an alignment head for test specimens which will compensate for initail misalignment or offset between the grips at opposite ends of the specimen and also for imperfections in the mounting between the grips and the specimen. The heads each have a piston member with a spherical seat that is initially unloaded and free to move after the specimen has been placed in the grips so that the units and the specimen seek and aligned position. The piston members are then forced against their seats and frictionally locked into place under hydraulic pressure after proper alignment has been obtained. There is, therefore, no initial residual bending stresses in the specimen.

In order to eliminate back-lash or slop between the actual parts holding the specimen and the rest of the head, a small hydraulic cylinder is integrally contained in the alignment head and will preload the specimen into its grip so that the cycling tension and compression tests may be run without any back-lash as the load passes through zero.

The alignment heads can be used with any type of attachment grip for the specimen, such as the conventional threaded ends, button ends or wedge grips. The unit is designed to go into conventional testing machines.

Additionally, structure for eliminating back-lash from the attachment members for connecting the alignment head to the machine is also shown in the present application. The alignment heads can be attached to the provided actuation or load cells in the testing machine with threaded studs. Cam type washers are provided between the portion of the machine to which the head or grip is attached and the alignment head. After the specimen has been placed in the alignment heads, and the alignment heads locked in place, the machine is loaded up to the maximum tensile load that the specimen will receive. This will put a stretch into the studs mounting the alignment heads to the cross heads of the machine. Cam type washers are then adjusted to take up all of the clearance between the grip alignment heads and the portions of the machine while the unit is under load. When the load from the machine is released the cam type washers will maintain the stud under maximum tension so that there will be no flexing of the stud and no back-lash in the threads holding the alignment heads to the machine.

Still further, a unique way of using an "O" ring for maintaining a hydraulic seal between the spherically seated members is disclosed.

Therefore, it is an object of the present invention to present an alignment head for use in testing machines which will eliminate initial bending stresses in the specimen being tested.

It is a further object of the present invention to present an alignment head which eliminates all back-lash in components holding the specimen in the machine.

It is a still further object of the present invention to present mechanical cam type washers for eliminating back-lash in fastening members where reversal of loads will occur.

It is an other object of the present invention to present a unique seat for an O-ring seal between mating spherical surfaces.

Other objects are inherent in the disclosure and will become apparent as this disclosure proceeds.

In the drawings,

FIG. 1 is a part schematic representation of a specimen testing machine utilizing alignment heads made according to the present invention;

FIG. 2 is an enlarged vertical sectional view of an alignment head made according to the present invention;

FIG. 3 is a sectional view taken as on line 3—3 in FIG. 2; and

FIG. 4 is an exploded view illustrating cam type washers utilized for eliminating back-lash in a threaded stud attaching the alignment heads to the base of the machine.

Referring to the drawings and the numerals of reference thereon, a testing machine is illustrated generally and schematically at 10. The machine 10 can be of any suitable design for testing a specimen 11, as shown. A suitable testing machine is Model 301.03 manufactured by Research Incorporated, Minneapolis, Minn. The machine has a main frame 12 with upper and lower frame sections as shown. Between the upper and lower frame sections the specimen 11 is positioned. Of course, the frame sections are connected together to form a unitary frame.

In the example shown, the machine 10 has a reciprocating hydraulic actuator 13 mounted on the frame for applying alternate tension and compression loads to the specimen 11. The actuator 13 is a conventional unit available on the market and is an integral part of the machine 10. In addition, the machine includes a lower adapter member 14 which is actuated by the reciprocating actuator 13, and the machine also has an upper load cell 15 to which the top of the load cell is utilized for measuring the load applied by the reciprocating hydraulic actuator and with suitable circuitry, the load can be recorded on a continuous basis if necessary. The load cell also is conventionally available and in use.

Connecting the specimen 11 to the load cell 15 and the adapter member 14 respectively, are alignment heads. An upper head 16 and a lower head 17 are utilized.

A typical alignment head is shown in section in FIG. 2. Both the upper and lower alignment heads are identical in construction.

As shown, the specimen 11 is attached to the grip through a threaded end portion 19 of the specimen, but the specimen could have a button head or a conventional tapered or wedge type grip can be utilized with the alignment heads of the present invention.

For convenience of illustration, the lower head is shown in section but the upper head is identical in construction and operation to the lower head.

Each of the alignment heads includes an outer housing 20. At the end of the housing adjacent the specimen 11 there is a cap 21 attached to the main portion of the housing with suitable cap screws 22. The cap 21 has a center threaded opening 23 into which the specimen 11 is threaded, as at 24.

The end of specimen 11 projects into a recess 25 in the end cap 21.

At the upper portion of the housing 20 (adjacent the specimen) there is a cylinder 26 formed. The cylinder 26 has a neck portion 27. The neck portion can be on a separate piece attached to the body 20 with the cap screws 22. The piston 30 is placed in the cylinder and this also has a neck portion 31 which protrudes through the neck 27 into the recess 25, as shown in FIG. 2. The main portion 32 of the piston divides the cylinder 26 into two chambers. An upper chamber 33 is open through a conduit 34 and suitable valves 35 to a pressure manifold 36 which in turn is open to a source of fluid under pressure 37.

The main chamber 40 of the cylinder 26 is open through a conduit 41 and valves 42 to the manifold 36 as well. As can be seen, fluid under pressure is introduced through conduit 41. Pressure in the chamber 40 will act against the end surface of the main portion of the piston 30 and will force it toward the specimen 11 so that the end surface of the neck portion 31 abuts against the end surface of the threaded portion 19 of the specimen and will force the specimen upwardly so that the threads 24 on the specimen and the internal threads in the threaded opening 23 are tightened together in one direction. The neck portion 31 constitutes load transfer means between the piston 30 and the specimen.

When the fluid under pressure is released from chamber 40 and introduced through conduit 34 into the chamber 33, the piston 30 will back away from the specimen and the specimen can be threaded into or out of the opening 23.

It will be seen that the main portion of the piston 30 is sealed with respect to the cylinder 26 with an O-ring 43 in the piston and the neck portion 31 is sealed with an O-ring 44 in the main body of the unit.

The lower portion or base end portion of the alignment head housing 20 also defines a cylinder 45. The cylinder 45 has a closed inner end formed by a conical wall section 46 and a part spherical inner end surface 47. A piston assembly 50 is mounted in the cylinder 45. The piston includes a head member 51 which has an inner concave end part spherical surface 52 and an annular convex part spherical back surface 53 which surrounds a piston shank 54. The shank 54 is integral with the head 51. The part spherical surfaces 47, 52 and 53 are concentric.

The head 51 also has a conical side edge surface 55 which is spaced from the conical surface 46 of the cylinder. The conical surface 55 joins end part spherical surface 52 and the annular part spherical surface 53.

The piston assembly 50 is retained in the cylinder with a plug 56 which, as shown, is threaded to the main housing 20 as at 57. The plug 56 has an interior end annular concave part spherical surface 60 which is adjacent to and mates with the annular surface 53 on the head of the piston 50. Surface 60 is complementary to surface 53. In addition, the plug 56 is sealed with respect to the outer housing 20 at its outer periphery with an O-ring 61 positioned in a provided groove. The plug has a center opening through which shank 54 passes. The opening is larger than the shank.

The piston 50 is permitted limited movement along the longitudinal axis of the alignment head and the piston is free to swivel on its spherical seat a limited number of degrees. The outer edge of the part spherical surface 60 on the plug is spaced from the wall of the cylinder. A part conical surface 63 of the plug joins the outer edge of the surface 60 and extends outwardly toward the wall of the cylinder. An elastic O-ring 62 is positioned over the conical surface 63 of the plug. The O-ring 62 is under sufficient tension so that it tends to slide along the conical surface 63 toward the piston part spherical surface 53. The clearance between end surface 52 of the piston and the inner end surface 47 of the cylinder (these two surfaces are complemented at the same radius) is quite small and even when these surfaces abut the O-ring is too large to pass between the end surface 60 on the plug and surface 53 on the cylinder. However, the conical surface and the tension of the O-ring 62 will always tend to pull the O-ring snugly against the surface 53 on the piston. The outer edges of concave surface 53 define a circle larger than the outer edges of surface 60. Stated another way, the chordal plane defined by the edges of surface 53 is of larger diameter than the chordal plane defined by the edge of surface 60.

The cylinder 46 is open through a conduit 64 and valve 65 to the manifold 36 which in turn is open to the source of high pressure fluid 37.

The shank 54 of the alignment head piston 50 is attached to the adapter 14 with a stud 66. The stud is threaded as at 67 into the shank 54 and is also threaded as at 68 to the adapter 14. The upper grip 16 is likewise attached to the load cell with a double threaded stud in exactly the same manner, except the load cell 15 will replace the adapter 14.

A pair of camming washers 70 are provided with center openings 71 which fit over the center portion of the stud 66, as shown, and these camming washers 70 are positioned between the outer end surface of shank 54 and the upper surface of adapter 14.

As shown, the pair of washers 70 includes an upper washer 72 and a lower washer 73. Lower washer 73 rests on the adapter 14 and the upper washer rests on the end surface of the shank 54. The washers are identically constructed and each includes a helical camming surface 74 which mates with the camming surface 74 of the other washer. By rotating the washers relative to each other, the axial or, as shown, vertical height of the pair of washers can be changed. As shown, the height is at a minimum, and by rotating the upper washer 72 in direction as indicated by arrow 75 in FIG. 4, the distance between the upper surface 76 of washer 72 and the lower surface 77 of washer 73 can be increased.

It should be noted that the washers 72 and 73 include small holes 78 which can be utilized for inserting suitable spanner wrenches for rotating the washers relative to each other.

*Operation*

When the unit is to be used, a specimen 11 is threaded into the caps 21 for the upper and lower alignment heads 16 and 17, respectively, and the specimen is placed into position on the heads. This is assuming that the heads are already in position on the upper and lower cross heads or frame members of the testing machine.

In order to eliminate all back-lash between the alignment head units, and the specimen, fluid under pressure is introduced into the chambers 40 of the upper cylinders in the heads. This will force the pistons 30 in direction so that the end surfaces of the pistons abut against their respective adjacent end surfaces of the specimen 11, as shown typically in FIG. 2. The pressure in the chambers 40 again must be great enough so that the total axial force of the piston will be greater than the maximum force exerted by the testing machine. This will prevent the specimen threads from moving from their positions locked against the threads in the cap 21. Thus the threads on the specimen are held tightly against one side surface of the threads in the cap during both compression and tension loading of the specimen. This will eliminate all back-lash from the attachment of the specimen to the heads. The same type of hydraulic anti back-lash device can be used with a button head or wedge attachment for the specimen. Once the specimen has been properly attached to the heads and locked in place, there usually is a slight bit of misalignment between the upper and lower grips or in the attachment devices for the specimen. If this is not compensated for the specimen 11 will be under initial, locked in bending stresses and will not be accurately tested. In order to insure that the specimen is not under initial bending stress the spherically seated alignment head pistons 50 are utilizsed in each of the alignment heads. The specimens can be positioned in the grip portion with no load or pressure in the cylinders 46 and thus the alignment head pistons are free to swivel and will seek their own seats on the surfaces 60 of the plugs 56. Once the grips and alignment heads have been properly positioned under no load, fluid under pressure is introduced through the conduits 64 to each of the cylinders 46 and the upper and lower grips. The pressure in the cylinders 46 is extremely high and the total force holding the surface 53 pistons 50 against their spherical seats 60 must be greater than the compressive force or load which will be exerted by the reciprocating hydraulic actuating mechanism 13. In other words, the spherically seated pistons must never move from their seats once they have been locked into position. Thus fluid pressures in the order of ten thousand pounds per square inch are utilized. In order to obtain this magnitude of pressure hand operated pumps may be used or any other suitable source. The fluid pressure acts uniformly on the piston and will not cause the piston to shift when pressure is supplied to the cylinder.

It should be noted that as soon as the pressure is introduced into the cylinder 46 the pressure will also act against the internal surfaces of O-ring 62 and force the O-ring against the surface 53 on the piston. There will be a differential pressure on the O-ring inasmuch as there will not be any fluid pressure acting on the surfaces of the O-ring touching the conical surface 63 or the spherical surface 53 on the piston. The O-ring will thus be tightly forced against the two surfaces and this will prevent leakage of hydraulic fluid from the cylinder past the spherical seat.

This is very important because when the cylinder is not under pressure, the O-ring 62 is easily moved down the surface 63 a sufficient distance so that the surfaces 60 and 53 will mate with metal to metal contact. If the O-ring was placed in a groove in one of the surfaces 53 or 60 it would be necessary to compress the O-ring before the surfaces would get metal to metal contact. Compression of O-rings is necessary in order to obtain proper seals in the ordinary case. In this case, the compression takes place after pressure has been applied to the cylinder and it is not necessary to pre-compress the O-ring before the pressure is applied. The proper alignment and seating of the surfaces 60 and 53 under no load is then possible, with no chance of shifting when the pressure is applied to the cylinder 46.

In order to remove all of the back-lash in the attachment stud between the machine and the alignment head, the testing machine is loaded up to the maximum tension load at which the specimen 11 will be tested. This, in turn, will stretch the studs 66 (one at each alignment head) to the maximum amount that they will be stretched during use and will also force the threaded ends 67 and 68 to seat against their mating parts as tight as they will ever seat under normal loading. Then, the camming washers 72 and 73 of each pair 70 are rotated with respect to each other so that the helical surfaces 74, 74 slide relative to each other and the distance between the respective outer end surfaces 76 and 77 on the two washers is increased. Once the cam washers are tightened sufficiently so that they lock against the end surface of the piston 50 and the end surface of the adapter 14 (or the load cell 15, as the case may be) the studs 66 will be held by the washers stretched the maximum amount that they will ever be stretched or, in other words, pretensioned to the maximum.

Then the load on the machine is relaxed and the studs 66 will still be held in a stretched or stressed position because of the holding action of the camming washers 70.

The reciprocating hydraulic actuator is activated and the specimen is tested as desired.

It can be seen that the alignment head pistons 50 having a spherical convex surface 53 seating on the spherical concave surface 60 will compensate for a good deal of misalignment between the upper and lower grips and also any misalignment which might arise between the attachment points of the specimen to the grip.

Also it can be seen that the spherical surface 52 not only provides a space to prevent losing the O-ring in the gap between the seats 53 and 60 but provides a seat for application of compression loads with no hydraulic pressure being necessary.

Further, the sealing of the spherical surfaces is accomplished easily by using the O-ring 62 on its conical surface 63. The back-lash in all of the connections is taken up by hydraulic cylinders and the camming washer as decribed and safe accurate testing results.

What is claimed is:

1. An alignment head for holding a specimen in a testing machine having a frame, said alignment head having first means at a first portion thereof for holding a specimen to be tested, and second means at a second end of said alignment head for connecting said head to the frame of the machine, said second means comprising a receptacle in said head having a part spherical seat surface facing in direction opposite from a predetermined direction of loading of said specimen, and a member positioned in said receptacle, said member having a part spherical surface mating the part spherical surface of the receptacle when said specimen is loaded in its predetermined direction of loading, and hydraulic pressure means having hydraulic fluid in contact with said member to lock said member and said receptacle relative to each other, with an axial force greater than the force exerted on the specimen during operation of the machine.

2. An alignment head for holding a specimen in a testing machine having a frame, said alignment head having means at a first portion thereof for holding a specimen to be tested, and means at a second end of said alignment head for connecting said head to the frame of the machine, one of said means comprising a receptacle in said head having a part spherical seat surface facing in direction opposite from a predetermined direction of loading of said specimen, and a member positioned in said receptacle, said member having a part spherical surface mating the part spherical surface of the receptacle when said specimen is loaded in its predetermined direction of loading, and hydraulic pressure means having hydraulic fluid in contact with said member to lock said member and said receptacle relative to each other with an axial force greater the load exerted on the specimen, said member being operative to transfer load from the machine to the specimen.

3. An alignment head for holding a specimen in a testing machine having a frame, said alignment head having means at a first portion thereof for holding a specimen to be tested, and means at a second portion of said alignment head for connecting said head to the frame of the machine, including a stud having threads at opposite ends thereof, said threads being threaded into said head and also into a portion of said machine, said head and said machine portion being spaced apart, first and second cam washers being adjustable in axial length positioned around said stud and between the machine portion and said head, said washers being adjustable so that an outer end surface of the first washer forceably engages a surface of said head and an outer end surface of the second washer forceably engages the machine portion when the specimen is subjected to its maximum tensile load, one of said means further including a receptacle in said head having a part spherical seat surface facing in direction opposite from a predetermined direction of loading of said specimen, and a member positioned in said receptacle, said member having a part spherical surface mating the part spherical surface of the receptacle when said specimen is loaded in its predetermined direction of loading, and means to lock said member and said receptacle relative to each other, said member being operative to transfer load from the machine to the specimen.

4. An enclosed housing-piston assembly including an outer housing with a receptacle having a side wall and one closed end defined therein, a piston assembly in said receptacle, said piston assembly including a head member smaller than the receptacle and a shank fixed to the head member and extending through an opening defined in the open end of the receptacle, said head member having a first annular part spherical surface extending from the shank member to the outer edge of the head member, a second annular part spherical surface that mates with the part spherical surface of the head member surrounding the opening at the said open end, the outer edge of the second part spherical surface terminating in inwardly spaced relationship from the side wall surface of the receptacle, a part conical surface joining the outer edge of the second part spherical surface, said part conical surface extending outwardly and away from the closed end toward the side wall surface of the receptacle hydraulic pressure means having hydraulic fluid in contact with said head member so as to lock the part spherical surfaces in mating contact, and an elastic ring positioned over the part conical surface under sufficient tension to cause said elastic ring to move toward the edge of the second part spherical surface, the first part spherical surface extending toward the side wall surface of the receptacle beyond the second part spherical surface, and the peripheral edge of the piston being spaced from said side wall surface.

5. The combination as specified in claim 4 wherein the alignment head has a cylinder defined therein adjacent the end thereof to which the specimen is attached, piston means in said cylinder, load transfer means between said piston means and the specimen, and means to introduce hydraulic pressure into said cylinder to force said piston in direction to exert a force on said specimen.

6. An alignment head for use in combination with a testing machine and including means for receiving and holding a specimen at a first end thereof, and alignment means at a second end thereof, said alignment means comprising a receptacle defining two concentric part spherical surfaces which are spaced axially apart, and a member having complimental part spherical surfaces positioned between the part spherical surfaces in the receptacle, means for attaching said member to an operative portion of said testing machine including a stud having threads at opposite ends thereof, said threads being threaded into said member and also into a portion of said machine, said member and said machine portion being spaced apart, first and second complimental cam washers being adjustable in axial length positioned around said stud and between the machine portion and said member, said washers being adjustable so that an outer end surface of the first washer forceably engages a surface of said member and an outer end surface of the second washer forceably engages the machine portion when the specimen is subjected to its maximum tensile load, and means to lock said member with respect to one of the receptacle surfaces.

7. An attachment device for eliminating back-lash in connections between a first member to be cyclically loaded and the base from which it is loaded, said device including an elongated member attached to said base in a manner to transmit load, said elongated member further being attached to the first member, said base and said first member being spaced apart, and cam means contacting said base and said first member and being adjustable in axial length so as to forceably engage the base and the first member when the first member is under maximum tensile load.

8. The combination as specified in claim 7 wherein the cam means is comprised as a pair of annular cam washers having complimental facing helical surfaces, and being positioned co-axially with the elongated member, the axial height of the washer assembly being adjustable by rotation of the washers relative to each other.

9. An alignment head for holding specimens in a testing machine, said alignment head comprising an outer housing, means for holding a specimen adjacent a first end of said outer housing, complimental cylinder and piston means at said first end of said housing, load transfer means engaged with the piston and positioned to engage a specimen held on said housing and to force said specimen in direction to be held immobile against a portion of the housing when fluid under pressure is introduced into said cylinder, a second cylinder at a second end of said housing, said second cylinder having an outer cylindrical wall and an inner end part spherical surface, the chordal plane of the part spherical surface being perpendicular to the axis of the first cylinder, a piston member mounted in said second cylinder and having a complimental part spherical surface adapted to mate with said inner end part spherical surface of the cylinder, said piston member having a shank portion of smaller diameter than the main portion of said piston, a plug member adapted to be sealingly secured within and with respect to the second cylinder and positioned concentric with and surrounding said shank member of the piston, said plug member having an annular part spherical surface substantially concentric with and spaced from the part spherical inner end surface of said cylinder, said piston further having an annular part spherical surface adapted to mate with the annular part spherical surface of said plug member, the plug further having a part conical surface joining said annular part spherical surface of said plug and extending toward the outer peripheral wall of said cylinder, and being spaced from the outer wall of said cylinder, an elastic sealing ring positioned over said part conical surface, said sealing ring being under tension when positioned over said part conical surface, and means to introduce hydraulic pressure into said second cylinder to force said annular part spherical surface of said piston against the annular part spherical surface of said plug member, said annular part spherical surface of said piston being of gretaer chordal length than said annular part spherical surface of said plug member, said hydraulic pressure forcing said sealing ring against the conical surface and the portion of said annular part spherical surface of said piston member protruding beyond the annular part spherical surface of said plug member.

10. The combination as specified in claim 9 wherein the piston is restricted in axial movement to a distance less than the diameter of the sealing ring.

11. An enclosed housing piston assembly capable of adjusting for misalignment including an outer housing with an interior surface defining a receptacle having one closed end, a piston assembly in said receptacle, said piston including a head member and a shank fixed to the head member and extending toward the open end of the receptacle, said head member having an annular part spherical surface extending from the shank member to the outer edge of the head member, a plug member sealingly secured in the open end of the receptacle and surrounding the shank member, the inner end of the plug member having an annular part spherical surface that mates with the part spherical surface of the head member, and terminates in inwardly spaced relationship to the interior surface of the housing, a part conical surface on the plug member joining the part spherical surface thereon, said part conical surface extending outwardly toward the inner surface of the receptacle, and an elastic ring positioned over the part conical surface under sufficient tension to cause said elastic ring to move toward the part spherical surface, the part spherical surface of the piston member extending toward the interior surface of the receptacle beyond the part spherical surface on the plug, the periphery of the piston being spaced from said interior surface.

12. A hydraulic actuated alignment head for use in combination with a testing machine and including means for receiving and holding a specimen at one end thereof, and two members comprising hydraulically actuated alignment means at a second end thereof, and means for obtaining a fluid seal between the members having first and second mating surfaces, respectively, the periphery of the first surface extending beyond the periphery of the second surface, said second surface being joined at its peripheral edge by a tapering surface extending around the periphery of the second surface and tapering outwardly from the second surface and in direction away from the first surface, an elastic ring flexible enough to conform to the shape of the taping surface and being under uniform tension when placed on said tapering surface the angle of taper being sufficient to cause the elastic ring to move toward said first surface.

13. The combination as specified in claim 12 and walls forming an enclosure around said members, an opening to said enclosure being surrounded by said second surface.

References Cited by the Examiner

UNITED STATES PATENTS

| | | | |
|---|---|---|---|
| 1,903,168 | 3/1933 | Cordrey | 220—46 |
| 2,419,711 | 4/1947 | Dillon | 73—103 |
| 2,444,541 | 6/1948 | Strickland | 269—75 |
| 2,559,925 | 7/1951 | Barker | 269—75 |
| 2,702,929 | 3/1955 | Laddon | 269—25 |
| 3,005,336 | 10/1961 | Wyman | 73—103 |
| 3,055,224 | 9/1962 | MacGeorge | 73—93 |
| 3,187,929 | 6/1965 | Shaw | 220—46 |

FOREIGN PATENTS 289,740   3/1953   Switzerland.

RICHARD C. QUEISSER, *Primary Examiner.*

J. H. WILLIAMSON, *Assistant Examiner.*

UNITED STATES PATENT OFFICE
CERTIFICATE OF CORRECTION

Patent No. 3,320,798                                                        May 23, 1967

Martin M. Gram

It is hereby certified that error appears in the above numbered patent requiring correction and that the said Letters Patent should read as corrected below.

Column 1, line 17, for "ot" read -- to --; line 27, for "initail" read -- initial --; line 33, for "and" read -- an --; column 5, line 1, for "utilizsed" read -- utilized --; column 6 line 48, for "greater the " read -- greater than the --; column 8, line 41, for "gretaer" read -- greater --; column 9, line 1, for "hydraulic" read -- hydraulically --.

Signed and sealed this 21st day of November 1967.

(SEAL)
Attest:

Edward M. Fletcher, Jr.                                     EDWARD J. BRENNER

Attesting Officer                                                   Commissioner of Patents